(12) United States Patent
Lee

(10) Patent No.: US 7,106,665 B2
(45) Date of Patent: Sep. 12, 2006

(54) METHOD OF OVERWRITING DATA OF REWRITABLE DISK

(75) Inventor: Myung Kuk Lee, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 544 days.

(21) Appl. No.: 09/946,555

(22) Filed: Sep. 6, 2001

(65) Prior Publication Data

US 2002/0036965 A1    Mar. 28, 2002

(30) Foreign Application Priority Data

Sep. 26, 2000   (KR)   ................................ 2000-56522
Feb. 15, 2001   (KR)   ................................ 2001-7620

(51) Int. Cl.
*G11B 21/08*   (2006.01)

(52) U.S. Cl. .................... 369/30.07; 369/53.2

(58) Field of Classification Search ............ 369/47.12, 369/47.13, 47.55, 53.2, 53.22, 53.37
See application file for complete search history.

(56) References Cited

U.S. PATENT DOCUMENTS

| | | | | |
|---|---|---|---|---|
| 5,265,230 A | * | 11/1993 | Saldanha et al. | ........... 711/161 |
| 5,613,112 A | * | 3/1997 | Nagashima | .................. 707/200 |
| 5,694,382 A | * | 12/1997 | Oliver et al. | ............ 369/53.24 |
| 5,812,883 A | * | 9/1998 | Rao | ............................ 710/74 |
| 5,940,853 A | * | 8/1999 | Ooi et al. | .................... 711/111 |
| 6,009,058 A | * | 12/1999 | Sims et al. | .............. 369/53.28 |

* cited by examiner

*Primary Examiner*—Paul W. Huber
(74) *Attorney, Agent, or Firm*—Birch, Stewart, Kolasch & Birch, LLP

(57) ABSTRACT

The present invention relates to a method of overwriting data of a rewritable disk quickly, which regards a rewritable disk as empty irrespective of whether or not the disk contains written data, or modifies not-empty-regarded information about a rewritable disk to empty one, based on a user's request; transmits disk information including said regarded or modified empty information to a host connected through an interface; and writes input data received from an external source from start of data recordable zone of the rewritable disk. This data overwriting method enables old data to be overwritten with new data without physical data erasing operation, thereby eliminating relatively long waiting time of a user until an inserted disk becomes empty.

22 Claims, 6 Drawing Sheets

*Conventional Art*

Conventional Art

Conventional Art

FIG. 6

*Disk Information Block*

| Bit<br>Byte | 7 | 6 | 5 | 4 | 3 | 2 | 1 | 0 |
|---|---|---|---|---|---|---|---|---|
| 0 | \multicolumn{8}{c}{Disk Information Length} | | | | | | | |
| 1 | | | | | | | | |
| 2 | Reserved | | | Erasable | State of last Session | | Disk Status | |
| 3 | Number of First Track on disk | | | | | | | |
| 4 | Number of Session | | | | | | | |
| 5 | First Track Number in Last Session | | | | | | | |
| 6 | Last Track Number in Last Session | | | | | | | |
| 7 | DID_V | DBC_V | URU | Reserved | | | | |
| 8 | Disk Type | | | | | | | |
| 9 | Number of Session | | | | | | | |
| ⋮ | ⋮ | | | | | | | |

FIG. 7

*Disk Status*

| Status | Definition |
|---|---|
| 00b | Empty Disk |
| 01b | Incomplete Disk (Appendable) |
| 10b | Complete (CD ROM or last session is closed and has no next session pointer) |
| 11b | Reserved |

METHOD OF OVERWRITING DATA OF REWRITABLE DISK

BACKGROUND OF THE INVENTION

1. Field of the Invention

The present invention relates to a method for overwriting data of a rewritable optical disk quickly without physical erasing operation.

2. Description of the Related Art

In general, a disk drive, which writes/reads data to/from a rewritable disk such as CD-R/W, is used as connected with a host such as a personal computer (PC). Therefore, a disk drive receives data to write from a host, and sends reproduced data to it.

A disk drive conducting these writing/reading operations is configured as FIG. 1. The disk drive of FIG. 1 comprises an optical pickup 2 for writing/reading data to/from a rewritable disk 1, for example, a CD-R/W, an R/F unit 3 for equalizing and shaping RF signals reproduced by the optical pickup 2 to produce binary signals, a digital reproduced signal processing unit 4 for processing the binary signals from the R/F unit 3 to restore original digital data, an interface 5 for transmitting the restored digital data to a connected PC 200 and receiving data and commands from the PC 200, a digital recording signal processing unit 6 for converting the data received through the interface 5 to writing signals suitable for an optical disk, a servo and drive unit 7 for adjusting rotation speed of the rewritable disk 1 and moving writing/reading position on the disk 1, and a microcomputer 8 for supervising overall operation for conducting an entered key command from a user or a requested command from the PC 200.

FIG. 2 is a procedure conducted in the disk drive 100 configured as FIG. 1 when data overwriting is requested for a data-contained rewritable disk 1.

Explaining the procedure depicted in FIG. 2, when the rewritable disk 1 is inserted in the disk drive 100 (S10), the microcomputer 8 reads out disk information from the rewritable disk 1 (S12). The disk information consists of data written in Program Memory Area (PMA) and Table Of Contents (TOC) in which navigation data for all recorded tracks are included.

If the rewritable disk 1 is CD-R/W, the PMA, located next to most inward Power Calibration Area (PCA) as shown in FIG. 3, has record information for all recorded tracks, and the TOC, written in Lead-In Area (LIA) located at the head of each session, has all information about each corresponding session.

Therefore, to read out the disk information, the microcomputer 8 searches the rewritable disk 1 for the PMA and the first TOC, first of all. After reading the disk information, the microcomputer 8 checks disk type and record status (S14) based on the read disk information, then, it transmits the checked disk type and record status to the PC 200 (S16) connected through the interface 5 as well as stores them locally. An Operating System (OS) running in the PC 200 stores the received information from the disk drive 100 in device management information.

If the inserted rewritable disk 1 has useless data in it, a user should make the disk 1 blank, that is, erase all data at first to write new data in the disk 1. If writing of new data is requested without data deletion, since the OS has already known the disk information stored in the device management information, it compares the size of new data with remaining storage capacity of the rewritable disk 1, which is included in the disk information, then, it requests the disk drive 100 to write the new data only if the size of new data is smaller than the remaining capacity, otherwise, it does not request. In case that the remaining capacity can accommodate the new data, the disk drive 100 writes the new data from the start of blank program area, namely, after the useless data written in the disk 1 because it is aware of current record status. As a result, the useless data still remains after new data is recorded.

In the meantime, if the disk drive 200 receives a command of 'disk erase' (S20), it checks the erasing type, namely, that is 'full' or 'quick'. If the type is 'full', the disk drive 200 makes a beam, whose power is set for data deletion, incident to whole disk area data have been written in, and if 'quick' it makes the erasing-power beam incident only to disk information area, i.e., PMA and each LIA to delete only disk information. FIG. 4 shows the erasing-power compared with reading and writing power. According to this erasing operation, the inserted disk becomes 'blank', so that the disk drive 200 reports the 'blank' status to the PC 200 (S22).

After receiving the 'blank' status from the disk drive 100, the OS of the PC 200 updates the device management information to reflect the 'blank' status of the inserted disk. Afterward, if new data is requested to be written, the OS checks whether the size of new data is smaller than the full storage capacity of the blank disk. If then, the OS requests the disk drive 100 to write the new data.

If the writing request is received (S24), the disk drive 100 writes the new data from the start of data zone of the rewritable disk 1 (S26) because the disk 1 has been made blank.

However, in the above data writing method, the necessary disk erasing operation takes long time even if its type is 'quick' needless to say 'full'-type erasing, which causes a user inconvenience of waiting too much to re-use a data-contained rewritable disk.

SUMMARY OF THE INVENTION

It is an object of the present invention to provide a method of initializing record status of a rewritable disk without physical data erasing operation at a request of a user to conduct data overwriting operation quickly.

A method of overwriting data of a rewritable disk according to the present invention, regards a rewritable disk as empty irrespective of whether or not the disk contains written data, or modifies not-empty-regarded information on a rewritable disk to empty one, based on a user's request; transmits disk information including said regarded or modified empty information to a host connected through an interface; and writes input data received from an external source from start of data recordable zone of the rewritable disk.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings:

FIGS. 6 and 7 show the format of a disk information block whose syntax is defined between a disk drive and a personal computer.

DETAILED DESCRIPTION OF THE PREFFERRED EMBODIMENT

In order that the invention may be fully understood, a preferred embodiment thereof will now be described with reference to the accompanying drawings.

Figure 1:
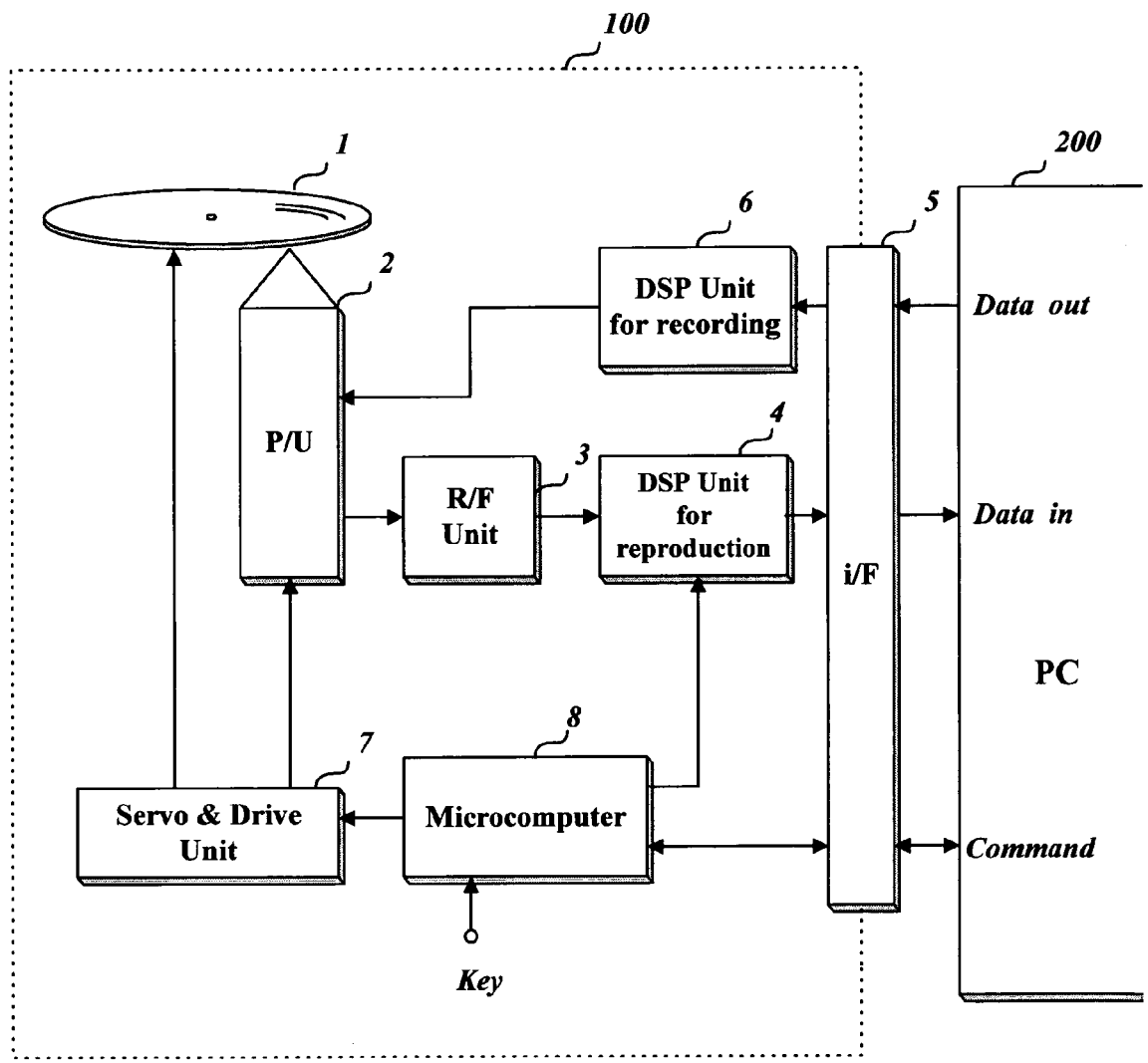
FIG. 1 is a block diagram of a conventional disk drive.
Figure 2:
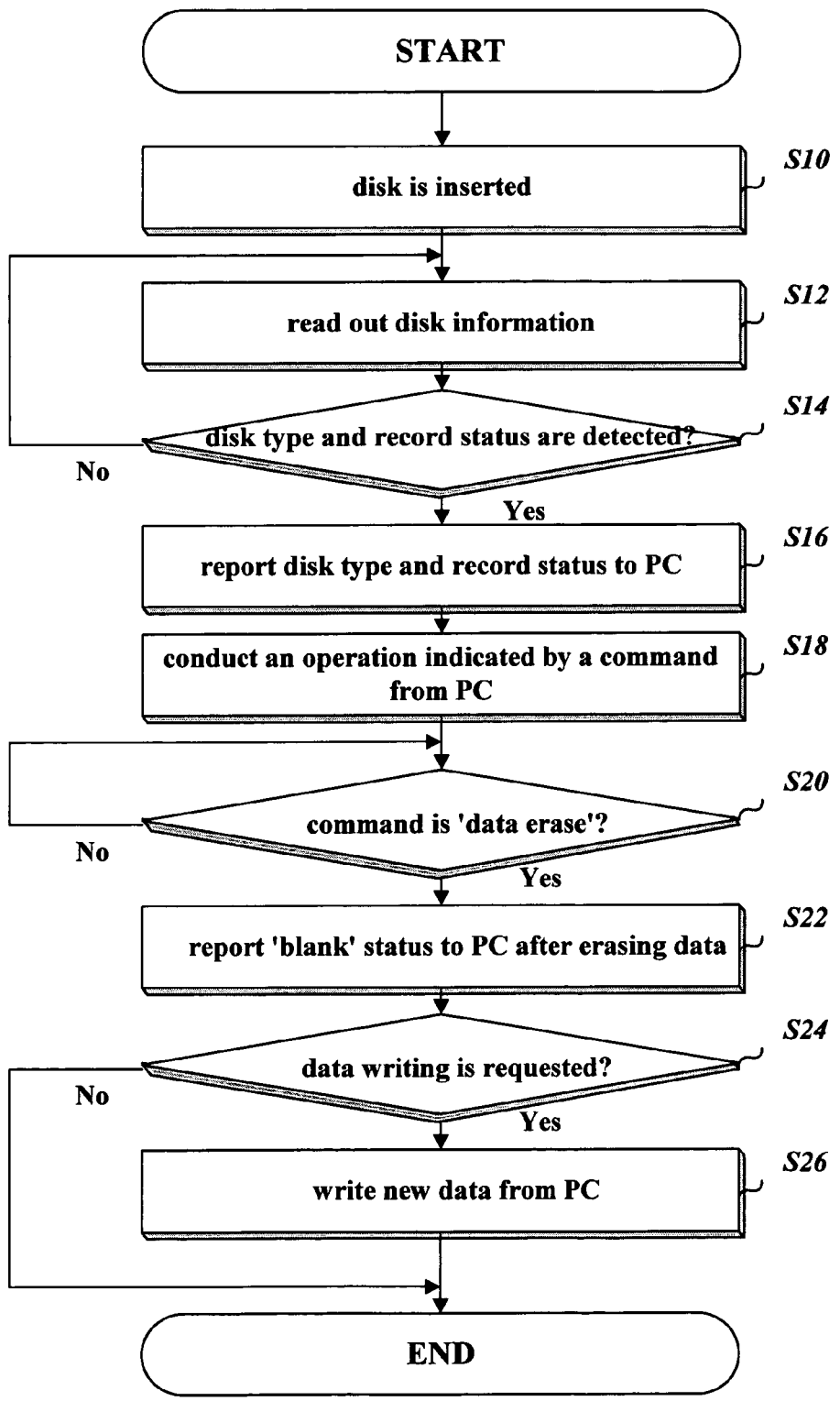
FIG. 2 is a procedure of data erasing and writing operation conducted by a conventional disk drive.
Figure 3:
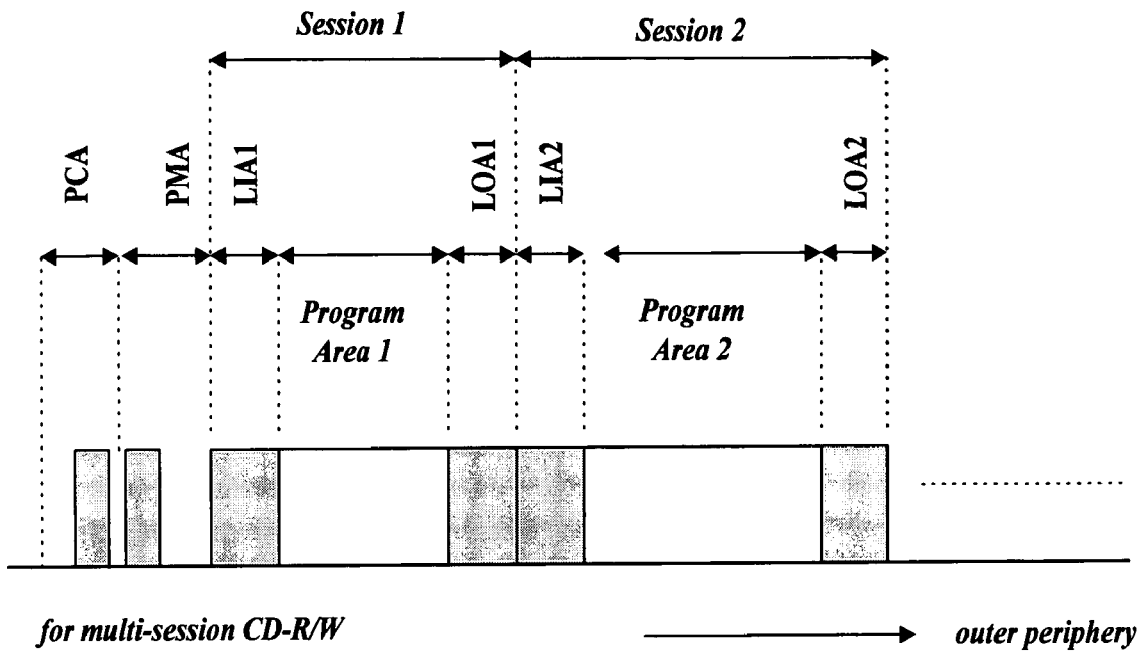
FIG. 3 shows a schematically-depicted example of data recorded on a rewritable disk.
Figure 5:
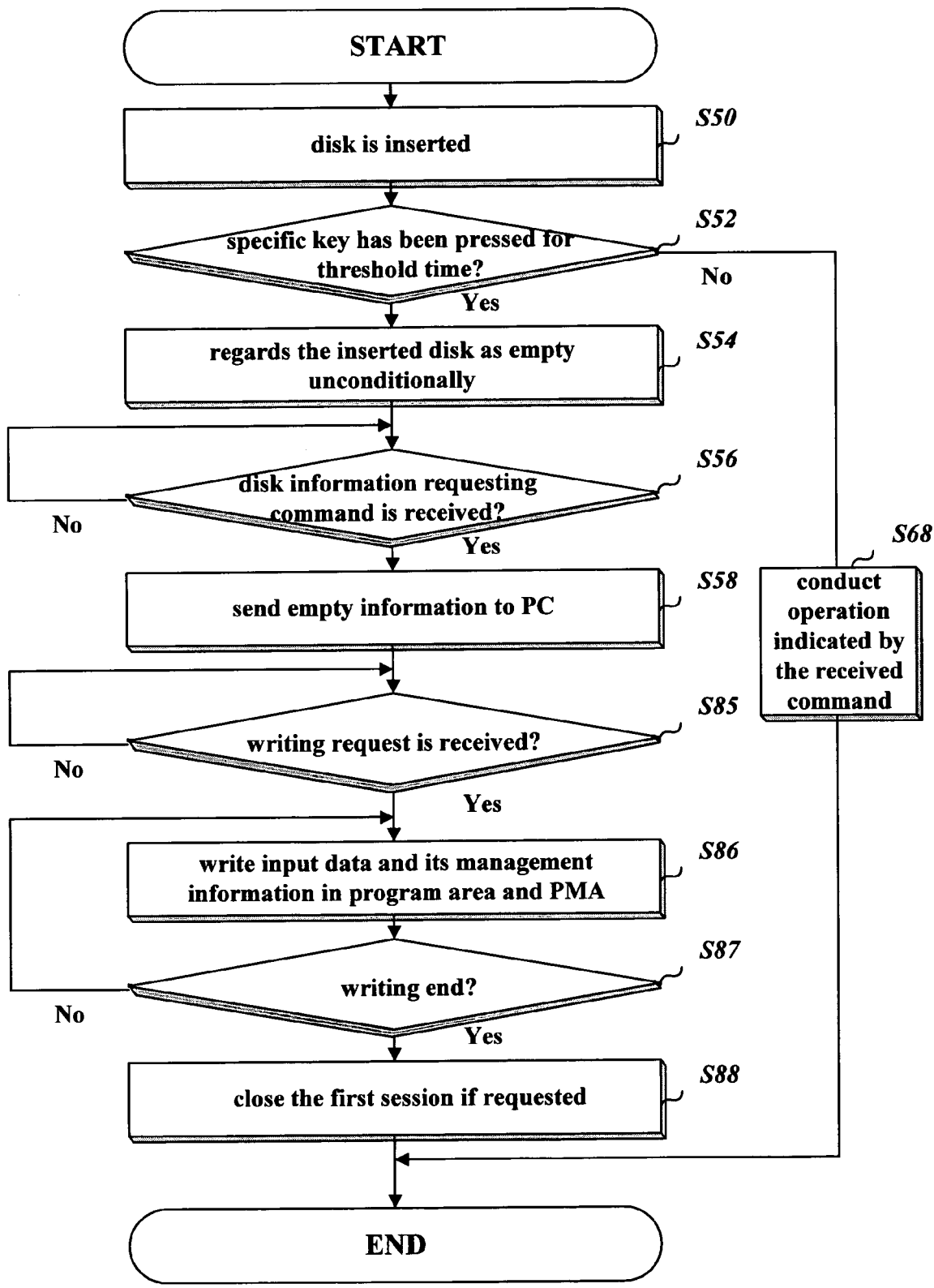
FIG. 5 is a flow diagram embodying a method of overwriting data of a rewritable disk according to the present invention.

FIG. 5 is a flow chart, which can be conducted by the disk drive configured as FIG. 1, embodying data overwriting method applicable to a rewritable disk according to the present invention.

If the rewritable disk 1 is inserted in the disk drive 100 connected with the PC 200 (S50), the microcomputer 8 conducts an initial operation to read out disk information (S68) written in PMA, which has navigation data for reading and writing, and TOC. During this initial operation, a pre-gap between data sections is also examined, and then it is determined which mode among 'Packet Writing (PW)', 'Track At Once (TAO)', and 'Session At Once (SAO)' has been used in writing the data of the rewritable disk 1.

After or during the initial operation, if a specific key button, for example, 'PLAY' button installed in the front panel of the disk drive 100 has been pressed for a predetermined threshold time (S52), the microcomputer 8 sets disk status of the inserted disk 1 to 'blank' or 'formatted' based on the determined record mode (S54).

That is, if the record mode used for the written data is TAO or SAO, the disk status is set to 'blank', and if PW, it is set to 'formatted'.

Afterward, if a disk information requesting command is received from the PC 200 connected through the interface 5 (S56), the microcomputer 8 writes the set disk status in the 'Disk Information Block (DIB)', which is pre-defined as FIG. 6 between the disk drive 100 and the PC 200, and then transmits the Block to the PC 200 (S58).

The DIB consists of fields of 2-byte 'Disk Information Length', 1-bit 'Erasable', 2-bit 'Status of Last Session', 2-bit 'Disk Status', and so forth. The 2-bit 'Disk Status' field, as given in FIG. 7, is indicative of 'blank' by 00$b$, 'appendable' by 01$b$, and 'complete' by 10$b$. The 'appendable' means that the last session is unclosed or there is a pointer of next session following the closed last session. And, the 'complete' means that there is no pointer of next session even if the last session is closed.

Therefore, the microcomputer 8 writes the value of 00$b$ to the 2-bit 'Disk Status' field of the DIB, and sends the DIB to the PC 200 (S58). Because the 'Disk Status' field of the received DIB is 00$b$, the PC 200 becomes aware that the rewritable disk 1 inserted in the disk drive 100 is empty, and stores the full storage capacity of the inserted disk 1 in the device management information of OS to refer when data writing is requested.

Figure 8:
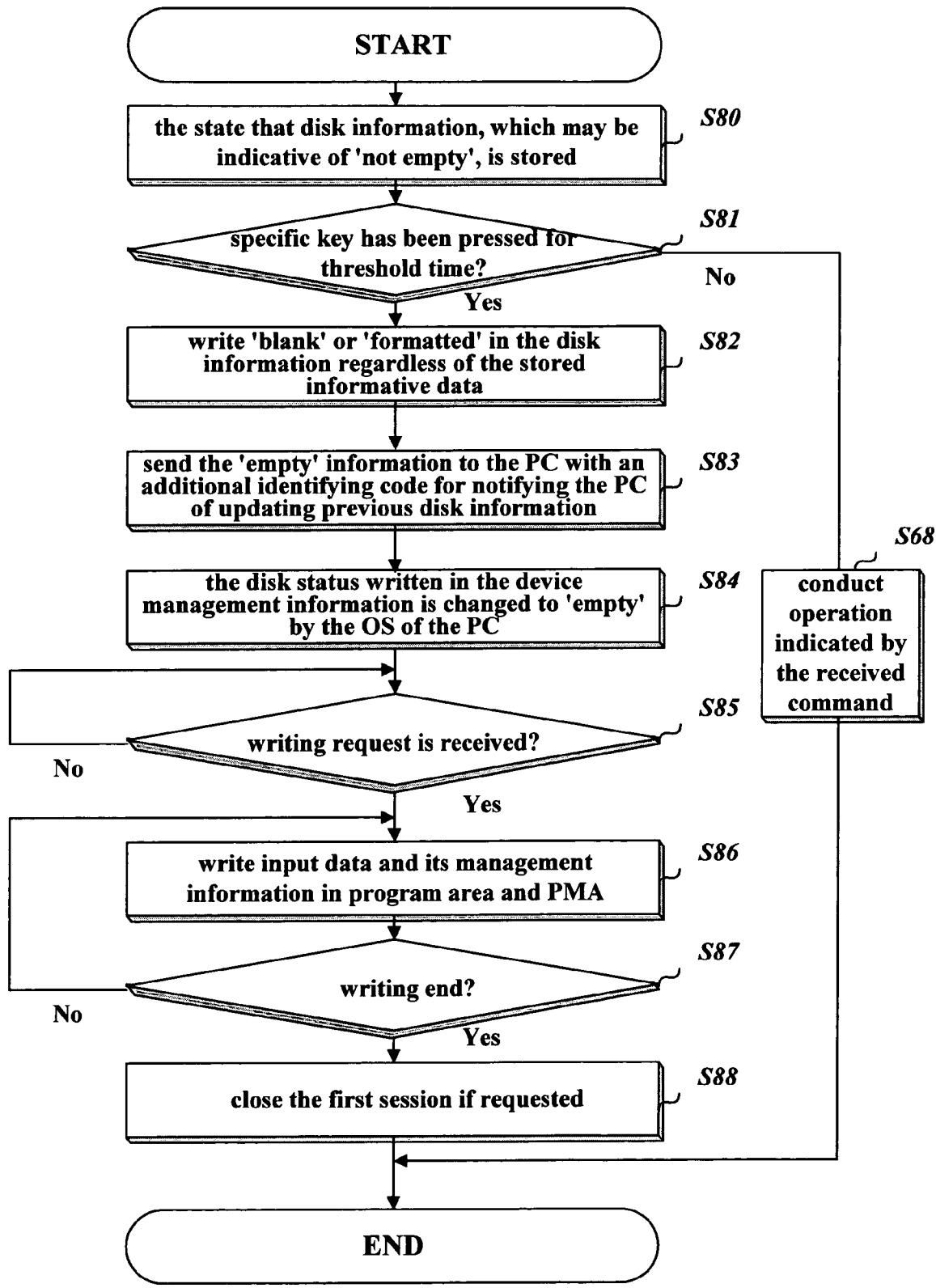
FIG. 8 is a flow diagram embodying another method of overwriting data of a rewritable disk according to the present invention.

FIG. 8 is a flow diagram embodying another method of overwriting data of a rewritable disk according to the present invention. This embodiment is for the following case.

If the specific key button is not entered during the initializing operation, the disk drive 100 stores the detected disk information in a local memory and reports it to the PC 200, which stores the disk information in the device management information of the OS, after the initializing operation is done.

In the condition that disk information, which may be indicative of 'not empty', has been stored in the PC 200 as well as the disk drive 100 (S80), a user who thinks that the data written in the inserted disk 1 are useless presses the specific key button longer than the predetermined threshold time (S81) if he or she wants to overwrite the useless data with new one without physical erasing operation.

Then, the microcomputer 8 forces the inserted disk 1 into empty, namely, it writes 'blank' or 'formatted' in the disk information (S82) regardless of all informative data read before, which are indicative of the number of recorded tracks, position of the last track, and so on. After changing the disk information forcibly as above, the microcomputer 8 sends the empty information in the format of DIB to the PC 200. At this time, an additional identifying code may be added to the DIB to notify the PC 200 (S83) to update previous disk information stored in the device management information.

If the DIB is received from the disk drive 100, the OS of the PC 200 changes the disk status written in the device management information to empty (S84).

Afterward, when a user requests the PC 200 to write new data in TAO or SAO, the PC 200 delivers the writing request to the disk drive 100 if the size of new data is smaller than the full capacity of the empty disk. If the disk drive 100 receives the writing request through the interface 5 (S85), the microcomputer 8 writes the new data received through the interface 5 from the start of data zone, which consists of program areas, of the rewritable disk 1, and also writes management information about the track, formed by the recorded new data, in the first block of the PMA (S86). If the disk information is indicative of not 'blank' but 'formatted', the disk drive 100 rejects the SAO- or TAO-writing request and reports rejection reason to the PC 200.

Figure 4:
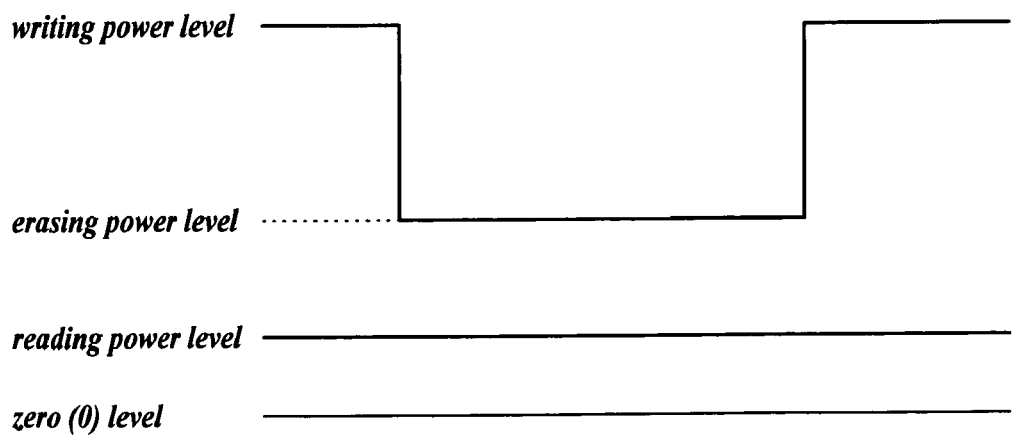
FIG. 4 shows an erasing-power compared with reading and writing power.

Because the writing power is higher than the erasing power as shown in FIG. 4, if the writing beam pulses conforming to new data are incident to data zone, new data are written and old data are erased at the same time.

After the overwriting operation is done (S87), if the session including the recorded track is requested to be closed, the microcomputer 8 writes necessary information such as position of the next session in the first LIA and Lead-Out Area (LOA), and closes the first session (S88).

In the meantime, when writing information about the first track in the first block of the PMA as above, next about 10 blocks are also erased or written with null data. The reason why next more blocks are erased or overwritten is to prevent possible errors in determination of recordable position which might be caused from remaining track information having been written next to the first block in the PMA for the recorded first track when the rewritable disk 1 is inserted into another disk drive.

If a user requests the PC 200 to write new data in PW mode, the microcomputer 8 of the disk drive 100 overwrites old data with the new data from the first formatted partition of data zone of the rewritable disk 1 if the disk information is indicative of 'formatted'. If the disk information is indicative of 'blank', the disk drive 100 rejects the writing request and reports rejection reason to the PC 200.

Due to this report of rejection reason, a user can command the disk drive 100 to format the inserted disk through the PC 200, and then he or she requests PW-mode writing to the disk drive 100 again after the formatting is done.

The above-explained data overwriting method according to the present invention enables old data to be overwritten with new data without physical data erasing operation, which eliminates relatively long waiting time of a user until an inserted disk becomes empty.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method of overwriting data of an inserted rewritable disk that may or may not contain data in its program memory area and table of contents, comprising the steps of:
   (a) regarding the rewritable disk as empty irrespective of whether or not the disk contains written data in its program memory area and table of contents if a user requests to write data to the rewritable disk;
   (b) transmitting disk information including the status of said regarded empty rewritable disk to a host connected through an interface; and
   (c) writing input data to the rewritable disk from the start of the record area of the rewritable disk based on regarding the rewritable disk as empty irrespective of whether or not the disk contains written data in its program memory area and table of contents without erasing any data on the disk before writing the input data to the disk.

2. The method set forth in claim 1, wherein said user request is in the form of pressing a pre-specified key button installed in a disk drive longer than a predetermined time.

3. The method set forth in claim 1, wherein said step (b) writes a value indicative of empty data in a disk information block, which is pre-defined between a disk drive and the host, and transmits the disk information block to the host.

4. The method set forth in claim 1, wherein said step (c) overwrites already-written data in a program recording area of the rewritable disk with the input data, writes recorded status of the input data in a corresponding management information block, and erases some blocks flowing said corresponding management information block.

5. The method recited in claim 1, wherein the step of transmitting disk information to a host further includes transmitting the disk type to the host.

6. The method recited in claim 1, further comprising:
   determining if the writing of input data is done; and
   closing a session if requested.

7. A method of overwriting data of an inserted rewritable disk, comprising:
   (a) checking disk status of the rewritable disk as being blank, appendable or complete;
   (b) storing record information based on the disk status obtained from said checking;
   (c) modifying the stored record information at a user's request to write data on the disk, by writing "blank" or "formatted" in the disk record information regardless of the stored record information data; and
   (d) transmitting the modified record information to a host connected through an interface.

8. The method set forth in claim 7, further comprising the step of (e) overwriting already-written data of the rewritable disk with input data from the host without erasing the already-written data physically, based on the modified record information.

9. The method set forth in claim 8, wherein said step (e) further compares a recording mode of the input data with that of the already-written data, which is detected in step (a), and conducts said overwriting operation based on the comparison result.

10. The method set forth in claim 7, wherein said step (a) checks the disc status based on information written in a program memory area allocated for temporary management information of recorded data.

11. The method set forth in claim 7, wherein said record information is to indicate whether the rewritable disk is empty or not.

12. The method set forth in claim 11, wherein said record information further includes a recording mode of the already-written data f the rewritable disk.

13. A system for overwriting data of an inserted rewritable disk that may or may not contain data in its program memory area and table of contents, comprising the steps of:
   (a) a component that regards the rewritable disk as empty irrespective of whether or not the disk contains written data in its program memory area and table of contents if a user requests to write data to the rewritable disk;
   (b) a component that transmits disk information including the status of said regarded empty rewritable disk to a host connected through an interface; and
   (c) a component that writes input data to the rewritable disk from the start of the record area of the rewritable disk based on regarding the rewritable disk as empty irrespective of whether or not the disk contains written data in its program memory area and table of contents without erasing any data on the disk before writing the input data to the disk.

14. The system set forth in claim 13, wherein said user request is in the form of pressing a pre-specified key button installed in a disk drive longer than a predetermined time.

15. The system set forth in claim 13, wherein component (b) writes a value indicative of empty data in a disk information block, which is pre-defined between a disk drive and the host, and transmits the disk information block to the host.

16. The system set forth in claim 13, wherein said component (c) overwrites already-written data in a program recording area of the rewritable disk with the input data, writes recorded status of the input data in a corresponding management information block, and erases some blocks flowing said corresponding management information block.

17. A system for overwriting data of an inserted rewritable disk, comprising:
   (a) a component that checks disk status of the rewritable disk as being blank, appendable or complete;
   (b) a component that stores record information based on the disk status obtained from said checking;
   (c) a component that modifies the stored record information at a user's request to write data on the disk, by writing "blank" or "formatted" in the disk record information regardless of the stored record information data; and
   (d) a component that transmits the modified record information to a host connected through an interface.

18. The system set forth in claim 17, further comprising component of (e) that overwrites already-written data of the rewritable disk with input data from the host without erasing the already-written data physically, based on the modified record information.

19. The system set forth in claim 18, wherein said component (e) further compares a recording mode of the input data with that of the already-written data, which is detected by said component (a), and conducts said overwriting operation based on the comparison result.

20. The method set forth in claim 17, wherein said component (a) checks the disc status based on information written in a program memory area allocated for temporary management information of recorded data.

21. The method set forth in claim 17, wherein said record information is to indicate whether the rewritable disk is empty or not.

22. The method set forth in claim 21, wherein said record information further includes a recording mode of the already-written data of the rewritable disk.

* * * * *